March 18, 1930. H. JESS 1,751,158
ATTACHMENT FOR HARROWS
Filed Aug. 18, 1928 2 Sheets-Sheet 1
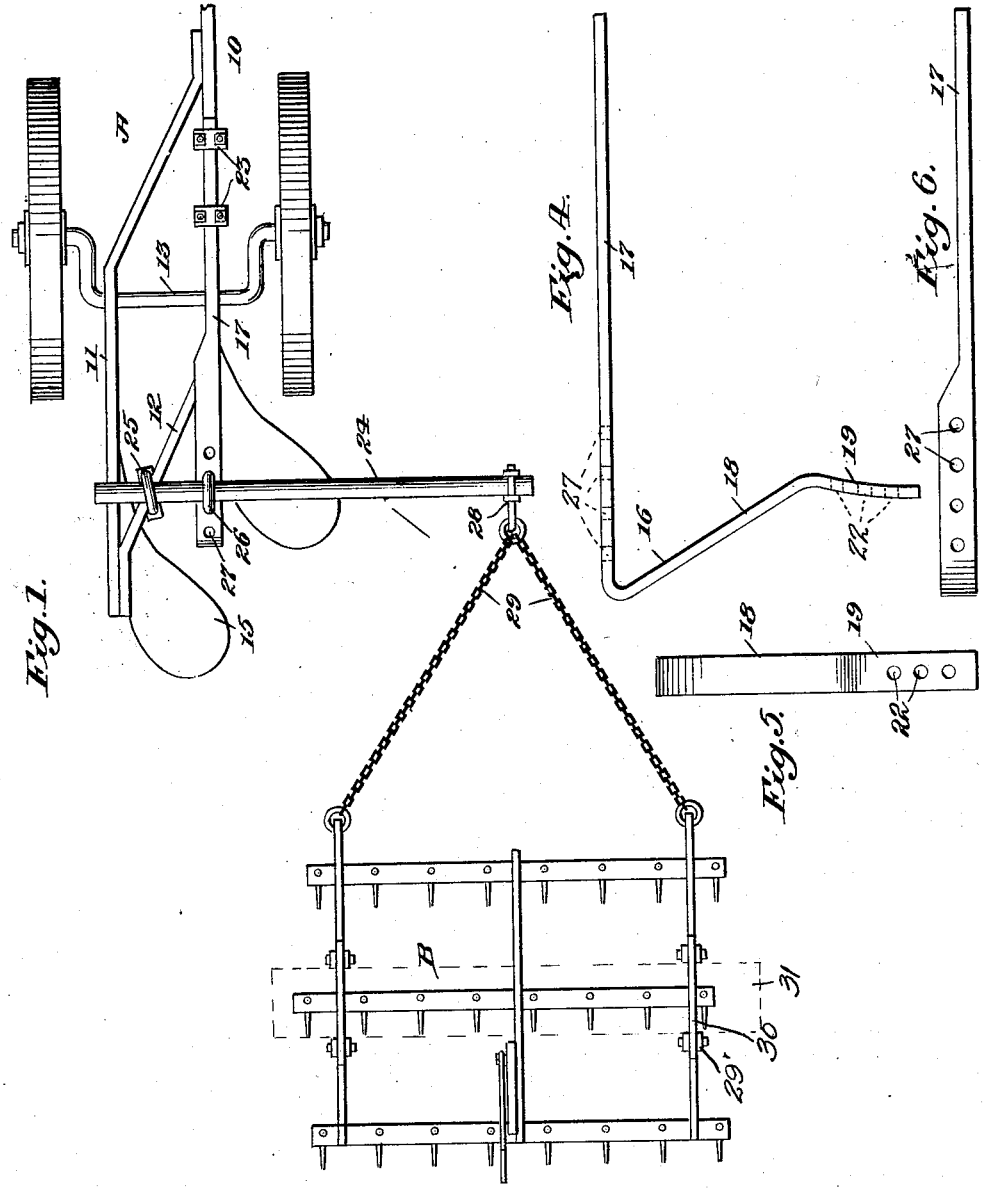
Inventor:
Henry Jess,
Atty.

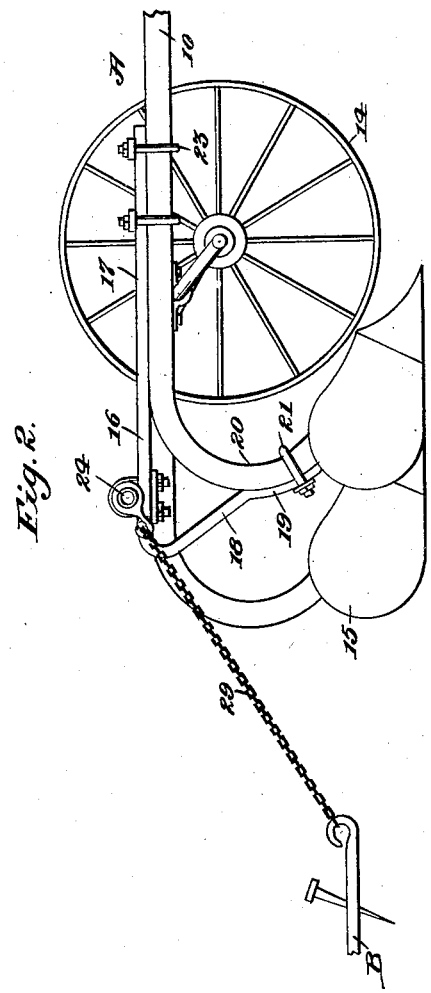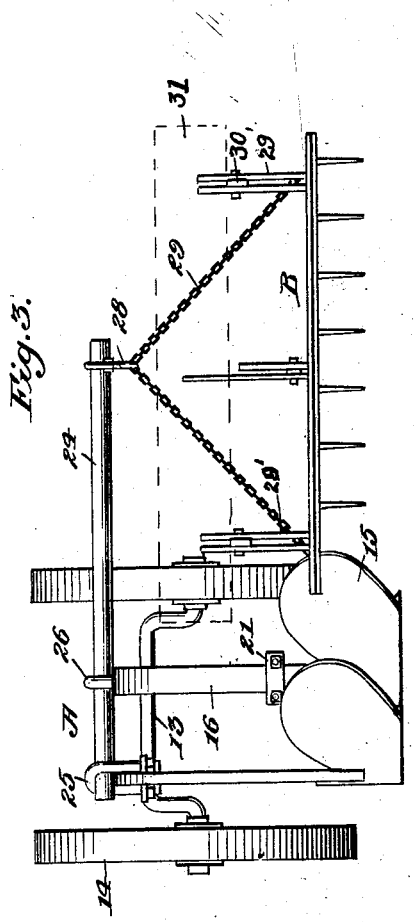

Patented Mar. 18, 1930

1,751,158

UNITED STATES PATENT OFFICE

HENRY JESS, OF SABULA, IOWA

ATTACHMENT FOR HARROWS

Application filed August 18, 1928. Serial No. 300,526.

This invention relates to soil tilling equipment and has particular reference to an attachment for coupling a harrow to a plow.

Prior to the present invention, it has been common and well known to couple a harrow or drag to a plow or cultivator and various attachments for effecting such a connection have been proposed. None of such attachments has proven entirely satisfactory, owing to several well known drawbacks such as complexity of construction, expensiveness, inability to properly position the harrow relative to the plow due to lack of flexibility and adjustability, difficulties of attachment and detachment, and insufficient durability to withstand the severe strains of service.

A general object of the present invention is to provide an improved harrow attachment in which the disadvantages and defects referred to are eliminated.

A further feature of the invention resides in the provision of a harrow attachment which is simple in construction, easy to apply to the plow without special tools, and readily adjustable so that the lateral and vertical positions of the harrow may be varied to meet the various conditions encountered in service.

These and other features of the invention will appear more fully from the following detailed description when read in connection with the accompanying drawings, and will be pointed out in the appended claims.

In the drawings,

Fig. 1 is a plan view of a plow and harrow connected by means of the improved attachment;

Fig. 2 is a side elevation;

Fig. 3 is a rear elevation; and

Figs. 4, 5 and 6 are a side elevation, a rear elevation and a plan respectively of the attachment bracket.

Referring more particularly to the drawings, reference character A denotes generally a plow having a frame 10, 11 and 12 for supporting the rear axle 13, the wheels 14 and the plow blades 15. B represents a harrow or drag of well known construction. Neither the harrow or plow constitute an essential part of the present invention, and only such parts thereof have been illustrated as are necessary for a clear understanding of the invention.

The attachment bracket 16 is preferably formed from a single strip of malleable iron or similar metallic material. The upper arm 17 has a flat lower face adapted to lie flush against the upper surface of the frame member 10, the arm being of such length as to extend along the frame a sufficient distance to obtain a substantial support. At the rear end of the upper arm is a downwardly extending arm 18 inclined inwardly at an angle of approximately 45° with respect to the upper arm. The inclined rear arm terminates in a vertical portion 19 bent on an angle of 45° with relation to said rear arm and occupying a position substantially perpendicular to the upper arm. The terminal 19 is struck on a slight curve to conform to the shape of the plow supporting portion 20 of the frame and with which it contacts. The terminal of the bracket is secured to the frame by means of a U-shaped clamp or clevis 21 and is provided with a plurality of vertically aligned holes 22 for selectively receiving a leg of the clamp and thus permit vertical adjustment of the rear end of the bracket. The front end of upper arm 17 is clamped to the frame member 10 by one or more U-bolts 23. In view of the fact that the attachment bracket 16 is formed of malleable iron or similar pliant material, the angularly formed rear portion of the bracket may be adjusted or moved vertically with respect to the attached forward end of the horizontal portion 17 of the bracket. After the rear portion of the bracket is properly adjusted, the U-shaped bolt or clevis 21 may be positioned with one of its legs inserted through one of the apertures 22 and encircling the plow supporting portion 20, in the manner illustrated in Figs. 2 and 3, for retaining the bracket so adjusted.

Extending transversely of the plow frame and at the rear thereof is a bar 24 which may take the form of a pipe, as illustrated. One end of the bar extends laterally beyond the plow a substantial distance, as clearly shown in Figs. 1 and 3. The opposite end of the bar is securely anchored to the plow frame 12 and attachment bracket by means of U-bolts 25 and 26 respectively. The rear end of the upper arm 17 of the supporting bracket is formed with a plurality of holes 27 which receive the arm of the U-bolt 26, and by selective engagement, permit horizontal adjustment of the bar 24.

The free and projecting end of the bar 24 is provided with a clevis 28 to which is fastened one end of the draft chains 29 anchored to each side of the harrow.

All parts of the attachment are readily assembled on the plow by an unskilled workman and without special tools. After the upper arm of the bracket is secured to the frame, the rear end is adjusted to desired vertical position and then anchored by passing the U-bolt through the appropriate hole 22. The bar 24 is then attached by means of the clevises 25 and 26, proper horizontal adjustment being made through the holes 27. Obviously, the lateral position of the harrow with respect to the plow may be varied by adjusting the bar 24 in an axial direction. Should, however, such adjustment not prove sufficient, a further range of positions may be obtained by shifting the clevis 28 along its supporting bar.

In addition to the features of adjustability and ease of assembly, the attachment is extremely simple in construction and is composed of a minimum number of parts. The attachment permits the raising and lowering of the plow without interference with the harrow. A further advantage is that when corners are being plowed, the harrow remains in proper position.

The efficiency of the harrow is greatly increased by the addition of a weight, and for best results the amount of the weight should be varied in accordance with the nature of the soil. While the illustrated harrow is generally of standard construction, provision is made for the reception of such a weight. To this end, each side of the harrow frame is provided with spaced vertical standards 29' connected by a transverse bar 30 which is arranged below the upper ends of the vertical standards. The transverse bars serve as a support for a log 31, or other weight, and the projecting ends of the vertical standards hold the weight in position. The weight is thus removably supported on the harrow and may be replaced or added to as the conditions of the soil demand.

Having thus described the invention, what I claim as new and desire to secure by Letters Patent of the United States is:

1. A harrow attachment for plows comprising a pliant one-piece bracket bent to form an angle and adapted to be secured to the frame of a plow with said angle portion free, means for adjusting the bracket relative to the frame to vary the elevation of the angle portion, a transverse bar arranged above the bracket and projecting beyond one side of the plow, and means for adjustably securing the transverse bar to the bracket at said angle portion.

2. A harrow attachment for plows comprising a pliant one-piece bracket adapted to be secured to the frame of the plow, means for adjusting the rear end of the bracket vertically with respect to the frame without disturbing the front end of the bracket, a transverse bar arranged above the bracket and projecting beyond one side of the plow, and means for adjustably securing the transverse bar to the rear end of the bracket.

3. A harrow attachment for plows comprising a pliant one-piece bracket, means for securing one end of said bracket to the frame of the plow, means for adjustably attaching the rear end of the bracket to the frame so as to permit a vertical adjustment thereof, a transverse bar arranged above the bracket and projecting beyond one side of the plow, means for adjustably securing the transverse bar to the bracket, and means for securing the bar to the frame.

4. A harrow attachment for plows including a pliant bracket having a horizontal arm and a vertical arm, each of said arms being provided with a plurality of openings, means cooperating with the openings in the vertical arm to adjustably secure the bracket to the frame of the plow, a transverse bar arranged above the bracket and projecting beyond one side of the plow, and means cooperating with the holes in the horizontal arm for adjustably securing the transverse bar to the bracket.

5. The combination with a traction device, of a harrow and a draft connection between the traction device and harrow, the said connection comprising a pliant bracket having a horizontal arm and a vertical arm, each of said arms being adapted to contact with portions of the frame of the traction device and being provided with a plurality of openings, means for securing the forward edge of the horizontal arm to the frame of the traction device, means cooperating with the openings in the vertical arm to adjustably secure said arm to the frame, a transverse bar above the bracket and projecting beyond one side of the traction device, means cooperating with the holes in the horizontal arm of the bracket for attaching the transverse bar to the bracket, and means connecting the projecting end of the transverse bar to the harrow.

6. The combination with a plow, of a harrow and a draft connection between the plow and the harrow, the said connection comprising a pliant bracket having a horizontal arm arranged above the frame of the plow, a downwardly extended arm inclined inwardly at an angle of approximately 45° with respect to the horizontal arm and a vertical portion at the lower end of the inclined arm, the rear part of the horizontal arm and the vertical portion being provided with a plurality of spaced openings, means for securing the front end of the horizontal arm to the plow frame, means cooperating with the openings in the vertical portion to adjustably secure such portion to the plow frame, a transverse bar arranged above the rear end of the bracket and projecting beyond one side of the plow, and means cooperating with the openings in the horizontal arm to adjustably attach the transverse bar to said bracket.

7. The combination with a plow, of a harrow and a draft connection between the plow and harrow, the said connection comprising a malleable iron bracket having a horizontal arm arranged above the frame of the plow, a downwardly extending arm inclined inwardly at an angle of approximately 45° with respect to the horizontal arm and a vertical portion at the lower end of the inclined arm, the rear part of the horizontal arm and the vertical portion being provided with a plurality of clevis-receiving openings, a clevis for anchoring the forward end of the horizontal arm to the plow frame, a clevis adapted to secure the vertical portion of the bracket to the plow frame and extending through the openings provided therein, a bar extending transversely of the plow above the rear end of said bracket, the said bar projecting a substantial distance beyond one side of the plow, a clevis for attaching the inner end of said bar to the plow frame, a clevis for attaching the bar to the horizontal arm of the bracket and extending through the openings provided therein, a clevis on the projecting end of the bar, and chain connections between the last-mentioned clevis and the harrow.

HENRY JESS.